United States Patent
Dandl et al.

(10) Patent No.: US 12,487,201 B2
(45) Date of Patent: Dec. 2, 2025

(54) METHOD FOR DIAGNOSING LITHIUM PLATING IN LITHIUM ION BATTERIES BY USING ELECTROCHEMICAL IMPEDANCE SPECTROSCOPY

(71) Applicant: Bayerische Motoren Werke Aktiengesellschaft, Munich (DE)

(72) Inventors: Sonia Dandl, Munich (DE); Peng Dong, Beijing (CN); Edwin Knobbe, Pfaffenhofen an der Ilm (DE); Sebastian Scharner, Tuerkenfeld (DE); Peng Wu, Tianjin (CN); Jianbo Zhang, Beijing (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 121 days.

(21) Appl. No.: 18/022,456

(22) PCT Filed: Aug. 19, 2021

(86) PCT No.: PCT/EP2021/073074
§ 371 (c)(1),
(2) Date: Feb. 21, 2023

(87) PCT Pub. No.: WO2022/038237
PCT Pub. Date: Feb. 24, 2022

(65) Prior Publication Data
US 2024/0035995 A1    Feb. 1, 2024

(30) Foreign Application Priority Data
Aug. 21, 2020    (CN) .................. 202010847320.6

(51) Int. Cl.
*G01N 27/02* (2006.01)
*G01R 31/36* (2020.01)
(Continued)

(52) U.S. Cl.
CPC .................................. *G01N 27/026* (2013.01)

(58) Field of Classification Search
CPC ...... G01N 27/02; G01R 31/36; G01R 31/389; G01R 31/392; G01R 31/396
See application file for complete search history.

(56) References Cited

U.S. PATENT DOCUMENTS

2014/0062415 A1* 3/2014 Barsukov ............ H02J 7/00041
    320/152
2022/0014035 A1* 1/2022 Janek ..................... H02J 7/0047
(Continued)

FOREIGN PATENT DOCUMENTS

CN       104868180 A    8/2015
CN       106199451 A    12/2016
(Continued)

OTHER PUBLICATIONS

International Search Report (PCT/ISA/210) issued in PCT Application No. PCT/EP2021/073074 dated Nov. 30, 2021 (two (2) pages).
(Continued)

*Primary Examiner* — Neel D Shah
(74) *Attorney, Agent, or Firm* — Crowell & Moring LLP

(57) ABSTRACT

A method for diagnosing lithium plating in lithium ion batteries includes performing electrochemical impedance spectroscopy analysis on complete or undisassembled lithium-ion batteries under different temperatures.

13 Claims, 3 Drawing Sheets

(51) Int. Cl.
*G01R 31/389* (2019.01)
*G01R 31/392* (2019.01)
*G01R 31/396* (2019.01)

(56) References Cited

U.S. PATENT DOCUMENTS

| | | | | |
|---|---|---|---|---|
| 2022/0126723 A1* | 4/2022 | Ferguson | ............. | B60L 3/0046 |
| 2022/0158167 A1* | 5/2022 | Xiao | .................... | H01M 4/133 |
| 2023/0176133 A1* | 6/2023 | Seong | .................. | H01M 10/42 |
| | | | | 702/63 |

FOREIGN PATENT DOCUMENTS

| | | |
|---|---|---|
| CN | 106680726 A | 5/2017 |
| CN | 106722099 A | 5/2017 |
| CN | 110515009 A | 11/2019 |
| EP | 3 598 557 A1 | 1/2020 |

OTHER PUBLICATIONS

Written Opinion (PCT/ISA/237) issued in PCT Application No. PCT/EP2021/073074 dated Nov. 30, 2021 (five (5) pages).

* cited by examiner

METHOD FOR DIAGNOSING LITHIUM PLATING IN LITHIUM ION BATTERIES BY USING ELECTROCHEMICAL IMPEDANCE SPECTROSCOPY

TECHNICAL FIELD

The invention relates to the field of lithium ion batteries, and in particular to a method for diagnosing lithium plating in lithium ion batteries by using electrochemical impedance spectroscopy.

BACKGROUND

Due to the unique advantages of lithium ion batteries (LIB), such as high energy and power density, low memory effect, and environmental friendliness, they have been widely used as energy sources for electric vehicles and hybrid electric vehicles, thereby replacing conventional fossil fuels. However, lithium ion batteries still face some key technical challenges, such as lithium metal plating on the anode. Lithium plating is kinetically favorable because the working potential of graphite is very close to the potential of metallic lithium deposition. The lithium plating on the anode in a lithium ion battery is closely related to charging conditions, such as low temperature, high charging rate and overcharging. These conditions result in high anode polarization and force anode potential to reach the threshold of metallic lithium plating, thereby leading to anode lithium plating. Lithium metal is usually deposited in a dendritic or mossy shape, which is one of the main causes of aging and safety accidents, such as short circuit caused by lithium accumulation. Therefore, the study of lithium plating is very important for the operation of a lithium ion battery under different working conditions. In order to determine whether lithium plating occurs, many methods are used as general techniques.

Visual observation techniques, such as naked eye, optical microscope, scanning electron microscopy (SEM) or transmission electron microscopy (TEM), can be used to observe the plating and morphology of lithium metal on the graphite anode. Different observation techniques determine whether the lithium ion battery needs to be disassembled or at least needs to be specially designed. Disassembly will cause irreversible damage to the battery. When lithium plating occurs, many measures can be taken to eliminate it, and the battery can be further recycled in the remaining life.

Electrochemical impedance spectroscopy (EIS) is a widely used tool for characterizing lithium ion batteries. The result is usually presented in the form of a Nyquist plot. The Nyquist plot may contain two "semicircles." The low-frequency semicircle may be attributed to the charge transfer at the electrode/electrolyte interface, and the high-frequency semicircle may be attributed to the interface between electrode particles and metal current collectors. In a very simple model, Rct is expected to follow the Arrhenius formula:

$$1/Rct = A e^{(-Ea/(k_B T))},$$

wherein Ea represents an activation energy associated with the site where lithium ion transitions through the solid electrolyte interface in the material, kB represents a Boltzmann constant, T represents temperature, and A represents a proportionality constant.

Conventional electrochemical impedance spectroscopy analysis usually requires attention to meet the environmental factors of electrochemical system, such as temperature control, so that the only corresponding causal relationship between measurement signal and disturbance signal is guaranteed during the analysis process, thereby eliminating any other interference signals. Therefore, the electrochemical impedance spectroscopy analysis for lithium ion batteries in the prior art is performed at the same temperature.

For example, CN106680726A discloses a method for testing the cycle performance of a lithium ion battery. The method includes performing a preset testing operation in real time after the lithium ion battery is subjected to a preset charge-discharge cycle test operation of different cycles. The testing operation includes real-time detection of the battery state of charge of the lithium ion battery. When the battery state of charge of the lithium ion battery reaches the preset battery state of charge value, the electrochemical AC impedance test is performed on the lithium ion battery to obtain preset AC impedance test parameters. However, the AC impedance test in this patent application document was not carried out at different temperatures.

CN106199451A discloses a method for testing the optimal compaction density of lithium iron phosphate positive plates of lithium ion batteries, wherein the test steps involve performing two electrochemical tests by using electrochemical workstation IVIUM-n-STAT. AC impedance spectroscopy test is carried out first, followed by a linear sweep test. The specific AC impedance spectroscopy test is performed at starting voltage of 3.42V-3.43V, scanning frequency of 100000-0.01 Hz, and current range of 100 mA. After open circuit voltage is stable, linear sweep is performed with voltage amplitude of 50 mV, voltage interval of 1 mV, scan rate of 1 mV/s, and current range of 1 mA. Finally, the relevant performance of the lithium iron phosphate positive plate was obtained by the result analysis. The AC impedance test in this patent application document was not carried out at different temperatures, either.

SUMMARY

There is a need in the art for a method for quickly analyzing and/or determining whether lithium plating occurs on the anode in a battery without disassembling the battery.

The inventors have found that an electrochemical impedance spectroscopy method can be used to determine whether lithium plating occurs in a battery without disassembling the battery. The inventors have found that since electrochemical impedance spectroscopy has temperature dependence, the results show differences when measured at different temperatures. Therefore, when electrochemical impedance spectroscopy measurement is performed in lithium ion batteries with and without lithium plating, the results of electrochemical impedance spectroscopy will exhibit different trends. Specifically, for lithium ion batteries without lithium plating, the curve in the Nyquist plot of electrochemical impedance spectroscopy shows a tendency to decrease in the real part (horizontal axis direction) as the temperature increases; on the contrary, in the case of a lithium ion battery with lithium plating, the curve in the Nyquist plot of electrochemical impedance spectroscopy shows a tendency to increase in the real part (horizontal axis direction) as the temperature increases. These two opposite results therefore provide a standard for quickly evaluating whether lithium plating occurs in a lithium ion battery.

Therefore, the present disclosure describes a method for determining whether lithium plating occurs on the anode of a lithium ion battery using electrochemical impedance spectroscopy at different temperatures. This method is very effective in diagnosing lithium deposition.

In one aspect, the present disclosure describes a method for analyzing the occurrence of lithium plating on the anode of a lithium ion battery using electrochemical impedance spectroscopy. The method is characterized by performing electrochemical impedance spectroscopy analysis on complete/undisassembled lithium-ion batteries under different temperature conditions, and determining the occurrence of lithium plating on the anode of the lithium ion battery according to the arrangement of the curves attributable to different temperatures on the obtained Nyquist plot.

In another aspect, the present disclosure describes a method for analyzing the occurrence of lithium plating on the anode of a lithium ion battery using electrochemical impedance spectroscopy, characterized by determining the occurrence of lithium plating according to the sequence of the arrangement of electrochemical impedance spectroscopy curves obtained under different temperature conditions.

In still another aspect, the present disclosure describes a method for analyzing the occurrence of lithium plating on the anode of a lithium ion battery using electrochemical impedance spectroscopy, characterized in that in the Nyquist plot of electrochemical impedance spectroscopy obtained at different temperatures, one or more curves obtained from low to high temperature are arranged from high frequency region to low frequency region, indicating the occurrence of lithium precipitation, or one or more curves obtained from low to high temperature are arranged from left to right in the real part, indicating the occurrence of lithium precipitation.

In yet another aspect, the present disclosure describes a method for analyzing the occurrence of lithium plating on the anode of a lithium ion battery using electrochemical impedance spectroscopy, characterized in that the temperature interval between different temperature conditions for performing electrochemical impedance spectroscopy analysis is 5~20° C., preferably 5-15° C., more preferably 5-10° C.

In still another aspect, the present disclosure describes a method for analyzing the occurrence of lithium plating on the anode of a lithium ion battery using electrochemical impedance spectroscopy, characterized in that the temperature change between different temperature conditions for performing electrochemical impedance spectroscopy analysis is continuous.

In still another aspect, the present disclosure describes a method for analyzing the occurrence of lithium plating on the anode of a lithium ion battery using electrochemical impedance spectroscopy, characterized in that multiple electrochemical impedance spectroscopy measurements are performed at each test temperature, preferably 1-10 measurements, more preferably 2-8 measurements, most preferably 3-5, 3 or 4 measurements.

EMBODIMENTS

Unless otherwise defined, all technical and scientific terms used herein have the same meanings as commonly understood by those skilled in the art. Although any methods and materials similar or equivalent to those described herein can be used in the practice or testing of the present invention, preferred methods and materials are now described.

In the present disclosure, the lithium ion battery may be the smallest basic functional unit of the lithium ion battery pack. The lithium ion battery pack may represent not only the rechargeable battery pack (secondary battery pack) but also the non-rechargeable battery pack (primary battery pack). Rechargeable lithium-ion batteries may be synonymous with lithium-ion secondary batteries. The two terms may also include lithium battery packs and lithium ion accumulator. The battery pack may be composed of at least two connected batteries. Typically, in a lithium ion battery pack, two or more lithium-ion batteries are connected in series or in parallel. Lithium-ion batteries here may include two opposite electrodes, a negative anode and a positive cathode. The two electrodes may be electrically and physically separated from each other by a separator arranged between the electrodes. Lithium ion batteries are usually filled with electrolyte. The separator can be penetrated by lithium ions, so ions can be exchanged between the anode and the cathode during charging or discharging.

As used herein, "active material" means the part of the electrode that stores lithium ions. In the case of the cathode, the active material may be a lithium-containing compound such as a lithium metal oxide complex. In the case of the opposite anode electrode, the active material may be silicon or lithiated silicon.

As used herein, the term "anode" refers to an electrode capable of donating electrons when the battery is in operation, which is also referred to as a negative electrode in the nomenclature.

As the active material of the anode, all materials known in the related technical field can be used. Regarding the anode in the sense of the present disclosure, there are no limitations. In particular, it is also possible to use mixtures of different active anode materials.

The anode material can be selected from lithium-metal oxides such as lithium titanium oxide, metal oxides (e.g. $Fe_2O_3$, $ZnO$, $ZnFe_2O_4$), carbon-containing materials such as graphite (synthetic graphite, natural graphite), graphene, mesophase carbon, doped carbon, hard carbon, soft carbon, fullerene, mixtures of silicon and carbon, silicon, lithium alloy, lithium metal and mixtures thereof. As anode materials, niobium pentoxide, tin alloy, titanium dioxide, tin dioxide and silicon can also be used.

The anode material may also be a material that can be alloyed with lithium. It may be a lithium alloy or an unlithiated or partially lithiated precursor, and a lithium alloy may be generated from the precursor during formation. Preferred materials that can be alloyed with lithium are lithium alloys selected from the group consisting of silicon-based alloys, tin-based alloys, and antimony-based alloys.

As the active material of the cathode, all materials known in the related technical field can be used. Regarding the cathode in the sense of the present disclosure, there are no limitations. In particular, it is also possible to use mixtures of different active cathode materials.

The electrochemical workstation used for the electrochemical impedance spectroscopy measurement of the method of the present disclosure is not particularly limited. It can be a conventional electrochemical workstation in the field, including a single-channel electrochemical workstation, a multi-channel electrochemical workstation, an integrated electrochemical workstation, etc., such as various types of electrochemical workstations provided by manufacturers or trademarks Zahner, Gamry, Vertex, etc. It is well known for those skilled in the art to plot the results obtained by the electrochemical workstation into corresponding Nyquist plot and to analyze it.

Considering in conjunction with the accompanying drawings, other objects, advantages and new features of the present invention may become apparent from the following detailed description of one or more preferred embodiments. The present disclosure is written for those skilled in the art. Although the present disclosure uses terms that may be unfamiliar to laymen, those skilled in the art should be familiar with the terms used herein.

It can be seen from the figure that there are multiple curves in each temperature group, and as the temperature increases at intervals of about 5-10° C., each group of curves belonging to the same temperature in the electrochemical impedance spectroscopy measured in this case moves to the right along the transverse axis in the Nyquist plot; that is, these groups of curves are arranged from low to high in the real part as the temperature increases.

Figure 2:
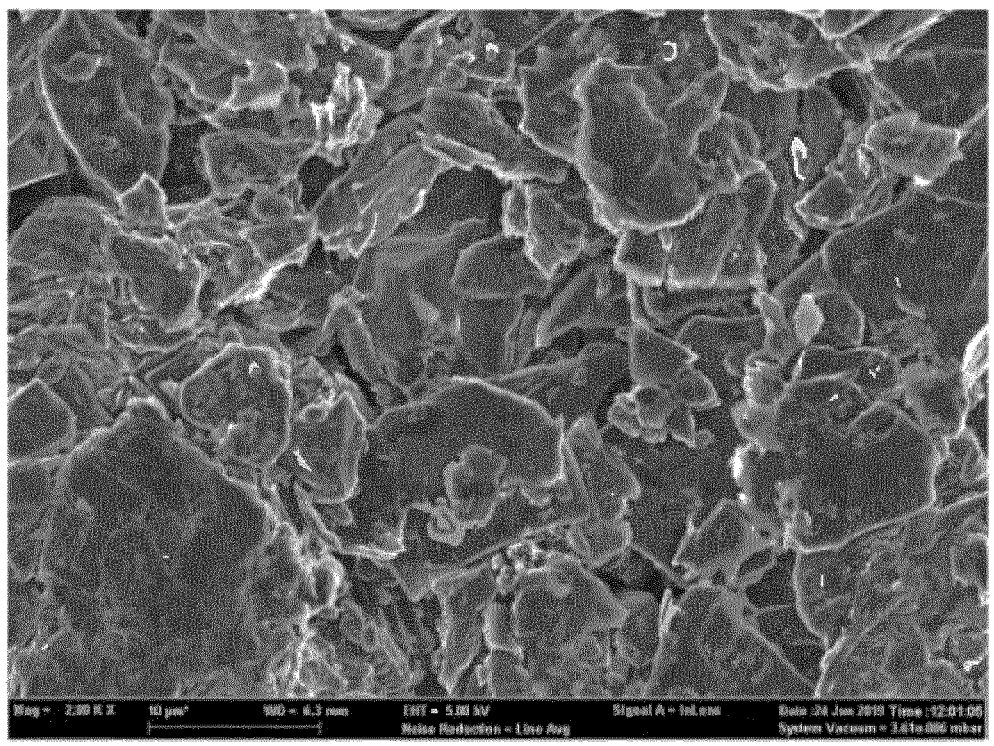

FIG. 2 is an SEM image of a graphite electrode sheet on which lithium metal is plated.

Figure 3:
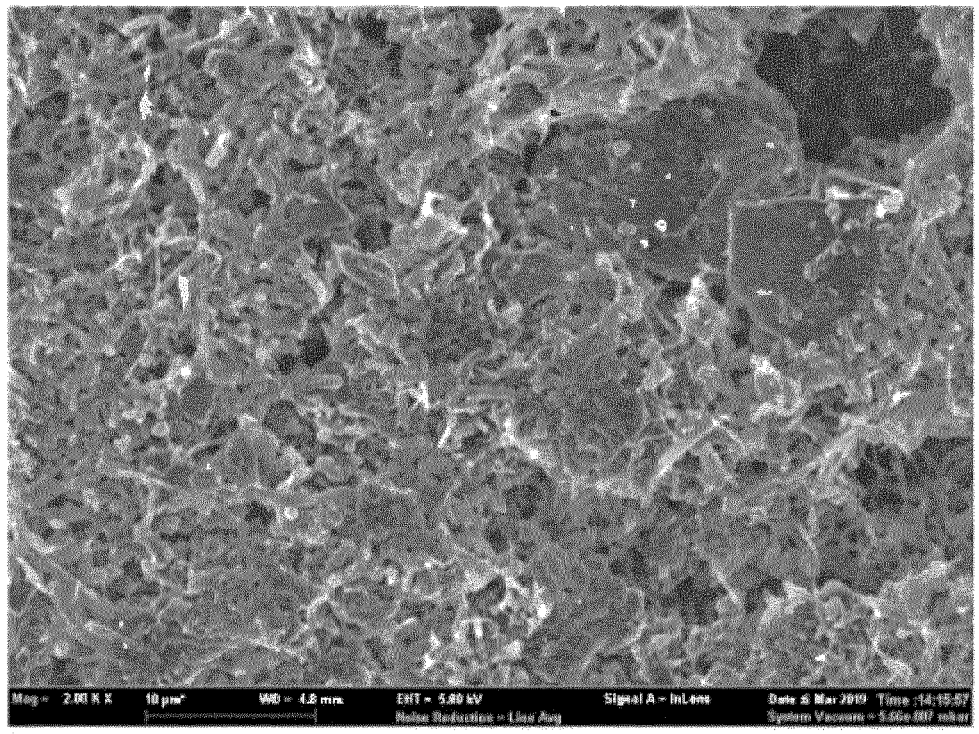

FIG. 3 is an SEM image of a fresh (no lithium plated) graphite electrode sheet.

Figure 4:

FIG. 4 is a photograph of a fresh (no lithium plated) graphite electrode sheet.

Figure 5:

FIG. 5 is a photograph of a graphite electrode sheet on which lithium metal is plated.

DETAILED DESCRIPTION OF THE DRAWINGS

Two commercial soft-pack batteries with graphite anodes with good consistency were selected in parallel and cycled at 0° C. and 0.3C rate to cause lithium plating. After 80 cycles, the capacity retention rate of the battery was about 90%.

Example 1 (Disassembly Inspection for Comparison)

One of the batteries was disassembled to check the appearance of lithium plating. Visual observation showed that the two had different states. It was found through observation that the gray area due to the plating of lithium metal can be visually observed on the anode (see the comparison between FIG. 4 and FIG. 5). After taking pictures of their surfaces using SEM method, changes were observed in their microscopic morphology.

Example 2 (Electrochemical Impedance Spectroscopy of the Disclosure)

Figure 1:
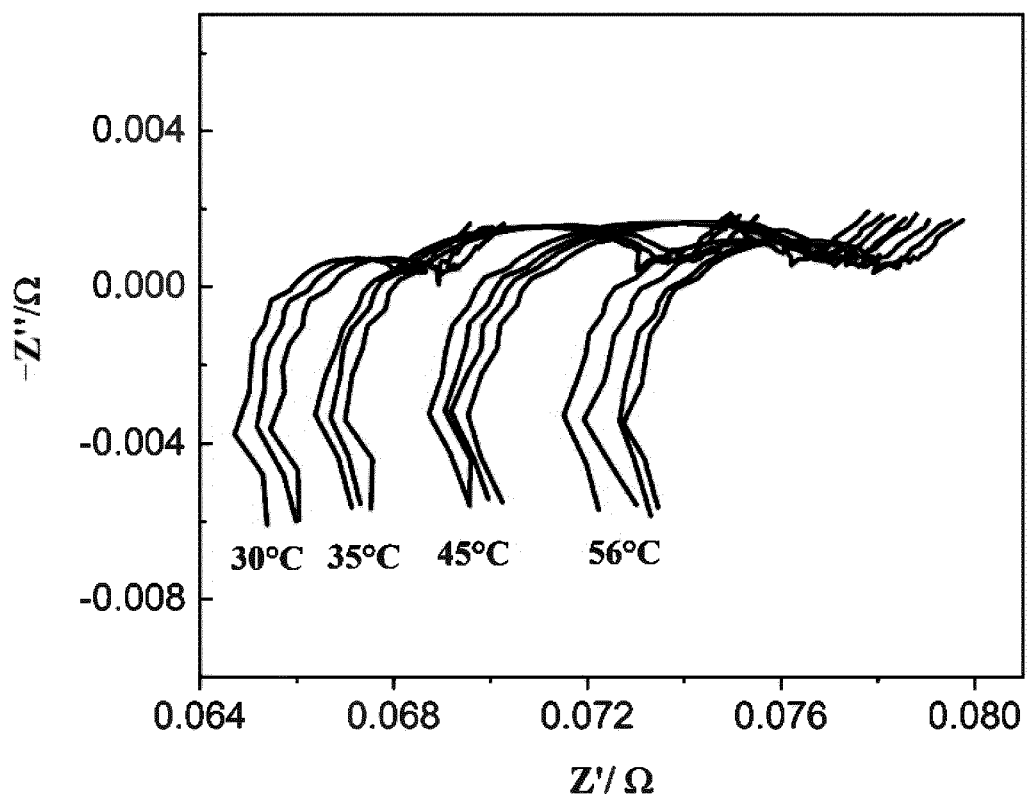
FIG. 1 shows the curves obtained by electrochemical impedance spectroscopy measurements of a sample at different temperatures; due to continuous change of temperature, 3-4 measurements are performed at each test temperature.

As a comparison, instead of disassembling the other battery, electrochemical impedance spectroscopy measurements were performed on the Autolab PGSTAT302N electrochemical workstation of Eco Chemie in the potentiostatic mode at different temperatures (30° C., 35° C., 45° C., 56° C.) (the test parameters were: 5 mV/$10^1$~$10^5$ Hz) to check the lithium plating. The results are summarized in FIG. 1, from which the trend of lithium plating in the battery can be clearly seen. As the temperature increased, the curve (group) continued to move to the right on the Nyquist plot. For impedance, the real part increased gradually. This change was not consistent with the temperature reversal in the case of lithium ion battery without lithium plating; that is, the real part decreased with the increase of measurement temperature. Therefore, the reason for this phenomenon can be attributed to lithium plating: with the increase of temperature, the plated lithium metal may be re-embedded in graphite. This reduced electronic conductivity and increased internal resistance, and the arrangement of curves in the electrochemical impedance spectroscopy increased with increasing temperature in the real part.

The invention claimed is:

1. A method for detecting an occurrence of lithium plating on an anode of a lithium ion battery using an electrochemical workstation during testing of the lithium ion battery, the method comprising:
   conducting, using the electrochemical workstation, electrochemical impedance spectroscopy measurements on the anode of a complete/undisassembled lithium ion battery under different temperature conditions;
   obtaining electrochemical impedance spectroscopy curves at the different temperature conditions;
   arranging the electrochemical impedance spectroscopy curves in a Nyquist plot; and
   determining an occurrence of lithium plating on the anode according to the arrangement of the electrochemical impedance spectroscopy curves,
   wherein the determination of the occurrence of lithium plating on the anode is made without disassembling the complete/undisassembled lithium ion battery.

2. The method according to claim 1, wherein,
   in the Nyquist plot of electrochemical impedance spectroscopy obtained under the different temperature conditions, the electrochemical impedance spectroscopy curves obtained from low to high temperatures arranged in order from a high frequency region to a low frequency region indicate the occurrence of lithium plating.

3. The method according to claim 1, wherein
   the electrochemical impedance spectroscopy curves obtained from low to high temperatures arranged from left to right in a real part or horizontal axis direction indicate the occurrence of lithium plating.

4. The method according to claim 1, wherein
   a temperature interval between the different temperature conditions for the electrochemical impedance spectroscopy measurements is 5-20° C.

5. The method according to claim 4, wherein
   the temperature interval is 5-15° C.

6. The method according to claim 5, wherein
   the temperature interval is 5-10° C.

7. The method according to claim 4, wherein
   a temperature change among the different temperature conditions for the electrochemical impedance spectroscopy measurements is continuous.

8. The method according to claim 4, wherein
   a plurality of the electrochemical impedance spectroscopy measurements are carried out at each of the different temperature conditions.

9. The method according to claim 8, wherein
   from 1 to 10 electrochemical impedance spectroscopy measurements are carried out at each of the different temperature conditions.

10. The method according to claim 9, wherein
    from 2 to 8 electrochemical impedance spectroscopy measurements are carried out at each of the different temperature conditions.

11. The method according to claim 10, wherein
    from 3 to 5 electrochemical impedance spectroscopy measurements are carried out at each of the different temperature conditions.

12. A method of testing a lithium ion battery using an electrochemical workstation, the method comprising:

performing, using the electrochemical workstation, electrochemical impedance spectroscopy measurements and analysis on the anode of a complete/undisassembled lithium ion battery under different temperature conditions, the performing comprising:

obtaining a Nyquist plot including an arrangement of curves attributable to the different temperature conditions; and determining an occurrence of lithium plating on the anode of the lithium ion battery according to the arrangement of curves, wherein the determination of the occurrence of lithium plating on the anode is made without disassembling the complete/undisassembled lithium ion battery.

13. The method of claim 12, wherein the occurrence of lithium plating is indicated by an increase in the curves in a real part or horizontal axis direction as temperature increases.

* * * * *